US010317876B2

(12) United States Patent
Shimizu

(10) Patent No.: US 10,317,876 B2
(45) Date of Patent: Jun. 11, 2019

(54) NUMERICAL CONTROL DEVICE AND CONTROL METHOD FOR NUMERICAL CONTROL DEVICE

(71) Applicant: FANUC CORPORATION, Yamanashi (JP)

(72) Inventor: Tsuyuki Shimizu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 47 days.

(21) Appl. No.: 15/787,856

(22) Filed: Oct. 19, 2017

(65) Prior Publication Data

US 2018/0113436 A1    Apr. 26, 2018

(30) Foreign Application Priority Data

Oct. 21, 2016  (JP) ................... 2016-206987

(51) Int. Cl.
 *G05B 19/408*  (2006.01)
(52) U.S. Cl.
 CPC .. *G05B 19/408* (2013.01); *G05B 2219/35386* (2013.01)
(58) Field of Classification Search
 None
 See application file for complete search history.

(56) References Cited

U.S. PATENT DOCUMENTS

2006/0239386 A1  10/2006  Endo et al.
2012/0283879 A1  11/2012  Takeuchi et al.
2015/0112459 A1*  4/2015  Haraguchi ........... G05B 19/408
                                                    700/86

FOREIGN PATENT DOCUMENTS

| CN | 104115079 A | 10/2014 |
|---|---|---|
| CN | 105182902 A | 12/2015 |
| JP | H3-198104 A | 8/1991 |
| JP | H4-177404 A | 6/1992 |
| JP | 2006-301930 A | 11/2006 |
| JP | 4558675 B2 | 10/2010 |
| JP | 2012-234445 A | 11/2012 |
| JP | 5210070 B2 | 6/2013 |

* cited by examiner

*Primary Examiner* — Sean Shechtman
(74) *Attorney, Agent, or Firm* — Hauptman Ham, LLP

(57) ABSTRACT

A numerical control device includes a program look-ahead unit for prereading and analyzing multiple blocks constituting a machining program, and a program execution unit for executing the blocks to control a machining operation and an auxiliary operation. The program execution unit sequentially executes the blocks in order from the initial block, and shifts an execution start time of the auxiliary operation block by an offset time corresponding to an auxiliary function code written in the auxiliary operation block.

13 Claims, 7 Drawing Sheets

OFFSET TIME $T_{SET}$

AUXILIARY OPERATION BLOCK: BM

NUMERICAL CONTROL DEVICE AND CONTROL METHOD FOR NUMERICAL CONTROL DEVICE

CROSS-REFERENCE TO RELATED APPLICATION

This application is based upon and claims the benefit of priority from Japanese Patent Application No. 2016-206987 filed on Oct. 21, 2016, the contents of which are incorporated herein by reference.

BACKGROUND OF THE INVENTION

Field of the Invention

The present invention relates to a numerical control device for controlling machining operations for machining workpieces to be machined with tools and auxiliary operations for assisting the machining operations, and also relates to a control method for the numerical control device.

Description of the Related Art

A numerical control device of a machine tool performs machining operations such as cutting, polishing, etc., of a workpiece while axially moving a tool and also performs subsidiary operations (auxiliary operations) for machining operations. Examples of auxiliary operations include tool changes, workpiece replacement and supply/suspension of cutting oil. By performing auxiliary operations of this kind in advance during machining operations as necessary, it is possible to shorten the processing time (cycle time) for the entire workpiece machining process.

For this reason, the numerical control device decides implementation of auxiliary operations by looking-ahead the machining program. For example, the numerical control device disclosed in Japanese Patent No. 5210070 includes a first machining program analyzer for analyzing the entire machining program and a second machining program analyzer for analyzing auxiliary operations alone in the machining program. Then, the auxiliary operations analyzed by the second program analyzer are performed in advance to thereby shorten the processing time.

SUMMARY OF THE INVENTION

However, the numerical control device disclosed in Japanese Patent No. 5210070 needs two analyzers for analyzing the machining program, so that the processing load on the numerical control device as a whole increases. In addition, the second program analyzer analyzes nothing but the auxiliary function codes of the machining program, and cannot adjust the execution timing of an auxiliary operation during the machining operation. Therefore, there is a risk that the auxiliary operation is implemented at unintended timing relative to the machining operation.

The present invention has been devised in view of the above circumstances, it is therefore an object of the present invention to provide a numerical control device that can favorably set an execution timing of auxiliary operations with a simple configuration so as to achieve both improvement in control scheduling and reduction in processing time, as well as providing a control method for the numerical control device.

In order to achieve the above object, according to an aspect of the present invention, there is provided a numerical control device for controlling a machine tool configured to machine a workpiece with a tool, including: a program look-ahead unit configured to sequentially preread and analyze multiple blocks constituting a machining program in order from an initial one of the blocks; and a program execution unit configured to execute the blocks preread and analyzed by the program look-ahead unit to thereby control machining operations and an auxiliary operation configured to assist the machining operations, wherein the multiple blocks include machining operation blocks with machining codes for performing the machining operations being written therein, and an auxiliary operation block with an auxiliary function code for performing the auxiliary operation being written therein, and the program execution unit is configured to sequentially execute the blocks in order from the initial block, and concerning the auxiliary operation block, shift an execution start time of the auxiliary operation block by an offset time corresponding to the auxiliary function code written in the auxiliary operation block.

According to the above configuration, when the program look-ahead unit detects an auxiliary operation block in the machining program, the numerical control device can shift the execution start time of the auxiliary operation block by the offset time corresponding to the auxiliary function code of the auxiliary operation block. That is, implementation of the auxiliary operation block can be performed at a time corresponding to the type of auxiliary operation. Therefore, the program execution unit can start controlling the auxiliary operation at timing suitable for the machining operation. Therefore, the numerical control device can favorably set the execution start time of the auxiliary operation, to thereby improve scheduling of control and shorten the processing time.

In this case, it is preferable that the program execution unit calculates a completion time required to complete execution of all machining operation blocks that have not yet been executed, among the already-preread machining operation blocks, at a detection time when the auxiliary operation block is detected by prereading of the program look-ahead unit, and starts execution of the detected auxiliary operation block at the execution start time that is shifted by the offset time from the calculated completion time.

Since the numerical control device calculates the completion time required to complete execution of all machining operation blocks that have not yet been executed, among the preread machining operation blocks, and shifts the completion time by the offset time, it is possible to calculate the execution start time of the auxiliary operation accurately.

Further, the program look-ahead unit or the program execution unit may calculate an execution standby time from the detection time to the execution start time, and starts execution of the detected auxiliary operation block when the execution standby time has elapsed after the detection time.

By calculating the execution standby time, the numerical control device can start to execute the auxiliary operation block at more accurate timing.

Further, it is preferable that the program look-ahead unit or the program execution unit calculates an execution time for each of the machining operation blocks, and the program execution unit calculates the completion time using the calculated execution time for each of the machining operation blocks.

By calculating the execution time for each block, the numerical control device can calculate the completion time more accurately.

In addition to the above configuration, when the machining operation block is a command for an axis movement in the machine tool, the program look-ahead unit or the program execution unit may calculate, as the execution time, a time required for the machine tool to perform the axis movement, based on a movement amount and a movement speed of the axis movement specified by the machining operation block.

The numerical control device calculates the execution time required for the axis movement of the machine tool, based on the movement amount and the movement speed of the axis movement specified by the machining operation block, so that the time required for the actual operation of the machining operation block can be calculated more accurately.

The program look-ahead unit or the program execution unit may compensate the execution time by using an override coefficient for adjusting the movement speed.

By compensating the execution time using the override coefficient, the numerical control device can reflect more accurate time on calculation. Therefore, it is possible to calculate the completion time with high accuracy.

When the machining operation block is a command for a dwell operation, the program look-ahead unit or the program execution unit may set a dwell time specified by the machining operation block as the execution time.

Since the numerical control device can calculate the completion time by taking into account even the time for dwell operations of the machining operation blocks, it is possible to start the auxiliary operation more accurately.

The program look-ahead unit or the program execution unit may compensate the execution time by using an override coefficient for adjusting the dwell time specified by the machining operation block.

This makes it possible to calculate the completion time including the override of the dwell time.

The program execution unit may have a table in which the offset time is stored in association with each of the auxiliary function codes.

In this manner, the program execution unit can easily set the offset time corresponding to the type of the auxiliary operation by referring to the table storing the offset time in association with each auxiliary function code.

Alternatively, the offset time corresponding to the auxiliary function code may be written in the auxiliary operation block.

Also, the numerical control device can easily set the execution start time of the auxiliary operation, using the offset time written in the auxiliary function code.

In order to achieve the above object, according to another aspect of the present invention, there is provided a control method for a numerical control device, the numerical control device controlling a machine tool configured to machine a workpiece with a tool, including: a look-ahead step of sequentially prereading and analyzing multiple blocks constituting a machining program in order from an initial one of the blocks; and an execution step of executing the blocks preread and analyzed in the look-ahead step to control machining operations and an auxiliary operation configured to assist the machining operations, wherein the multiple blocks include machining operation blocks with machining codes for performing the machining operations being written therein, and an auxiliary operation block with an auxiliary function code for performing the auxiliary operation being written therein, and in the execution step, the blocks are sequentially executed in order from the initial block, and concerning the auxiliary operation block, an execution start time of the auxiliary operation block is shifted by an offset time corresponding to the auxiliary function code written in the auxiliary operation block.

In this case, the execution step may calculate a completion time required to complete execution of all machining operation blocks that have not yet been executed, among the already-preread machining operation blocks, at a detection time when the auxiliary operation block is detected by prereading in the look-ahead step, and starts execution of the detected auxiliary operation block at the execution start time that is shifted by the offset time from the calculated completion time.

In addition to the above configuration, it is preferable that the look-ahead step calculates an execution time for each of the machining operation blocks, and the execution step calculates the completion time using the calculated execution time for each of the machining operation blocks.

Further, the execution step may acquire the offset time from a table in which the offset time is stored in association with each of the auxiliary function codes.

Alternatively, the offset time corresponding to the auxiliary function code may be written in the auxiliary operation block.

According to the numerical control device and the control method for the numerical control device of the present invention, it is possible to favorably set the time of implementing auxiliary operations with a simple configuration so as to achieve both improvement in control scheduling and reduction in processing time.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is an explanatory diagram showing an example of a machining program according to a second embodiment.

DESCRIPTION OF THE PREFERRED EMBODIMENTS

Now, a numerical control device and a control method for the numerical control device according to the present invention will be detailed by describing preferred embodiments with reference to the accompanying drawings.

[First Embodiment]

Figure 1:
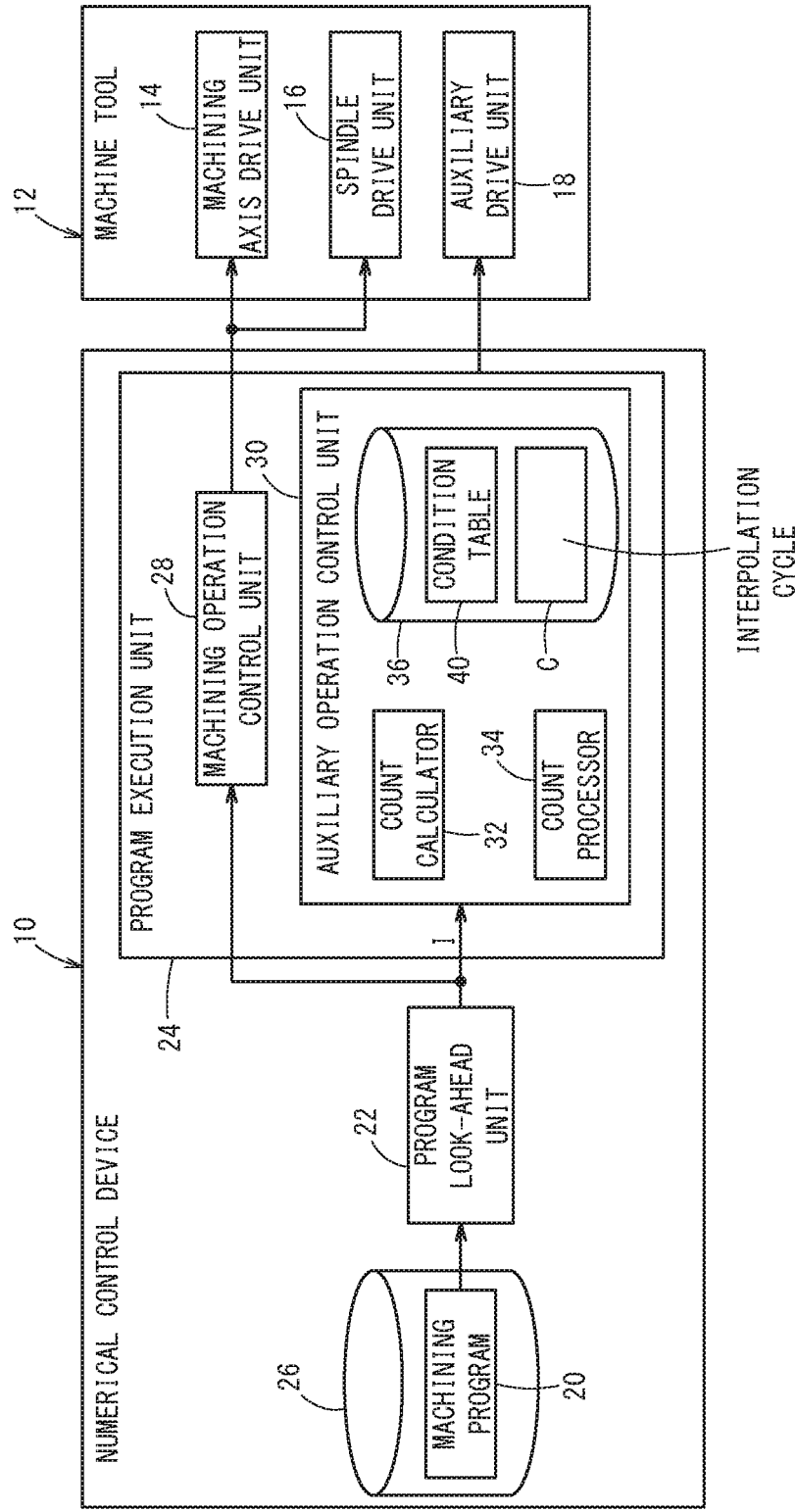
FIG. 1 is a block diagram schematically showing the overall configuration of a numerical control device and a machine tool provided with the numerical control device according to a first embodiment.

As shown in FIG. 1, a numerical control device 10 according to the first embodiment of the present invention is provided in a machine tool 12 to control the machining process of the machine tool 12. In the machining process, a tool or workpiece held by the machine tool 12 is moved so as to machine the workpiece by the tool. Examples of the machining of the workpiece to be processed by the numerical control device 10 include cutting (lathing, milling, drilling, boring, etc.), grinding (surface grinding, internal grinding, etc.), and special machining (laser machining, electrical discharge machining, etc.).

In addition, the numerical control device 10 performs auxiliary operations such as assisting a machining operation in progress or preparing for an expected machining operation, simultaneously with the current machining operation. In particular, the numerical control device 10 according to the present embodiment is configured to set the execution timing of auxiliary operations appropriately and detailedly relative to the machining operation. As a result, the numerical control device 10 can perform the machining process, switching of operations, etc., more smoothly in a shorter time.

The numerical control device 10 according to the first embodiment is provided in the machine tool 12 having multiple axes such as linear motion axes and rotational axes and outputs drive commands to the machine tool 12. For example, the machine tool 12 has three linear motion axes in X, Y and Z directions orthogonal to each other and a spindle for rotating a tool about its axis. Hereinafter, the three-axis machine tool 12 and the numerical control device 10 installed in the machine tool 12 will be described as a typical example. However, the number of axes and structure of the machine tool 12 to which the numerical control device 10 is applied is not particularly limited, and it goes without saying that the numerical control device 10 may be applied to machines other than machine tools.

In the machine tool 12, multiple drive units drive respective axes under the control of the numerical control device 10 to perform turning of the tool, axial feeding of the tool and/or the workpiece, and the like. More specifically, the drive units of the machine tool 12 include machining axis drive units 14 composed of servo motors (including servo amplifiers) and the like, a spindle drive unit 16 composed of a spindle motor and the like, and auxiliary drive units 18 for performing auxiliary operations.

Three machining axis drive units 14 are provided corresponding to three axial directions. Each machining axis drive unit 14 has an unillustrated moving member that moves along the associated predetermined axis, and moves the moving member to a commanded position based on drive commands (information on the rotational speed and the rotational amount) from the numerical control device 10. On the other hand, the spindle drive unit 16 rotates the tool around the axis of the spindle based on drive commands (information on the rotational speed and the rotational amount) from the numerical control device 10.

Commands to start and stop rotation of the tool are described by auxiliary function codes (M-codes) in a machining program 20, and are hence basically categorized as auxiliary operations. That is, the auxiliary operations include: operations (hereinafter also referred to as linked auxiliary operations) that are performed in succession with machining operations of the machining axis drive units 14 and the spindle drive unit 16; and operations (hereinafter also referred to as independent auxiliary operations) that are performed individually by devices (the auxiliary drive units 18 and the like) other than the machining axis drive units 14 and the spindle drive unit 16 while the workpiece is being machined. In the present embodiment, an auxiliary operation performed during the machining operation basically refers to an independent auxiliary operation. However, there are cases where a linked auxiliary operation is performed for a preparatory function while the workpiece is being machined. In this case, the setting of the execution timing for auxiliary operations of the present invention can be applied.

Examples of the linked auxiliary operations include start and stop of rotation of the spindle, pause of the program and the like. On the other hand, examples of the independent auxiliary operations include operation of a coolant device for supplying a cutting fluid or stopping supply of a cutting fluid, operation of a magazine device for preparing tool changes, operation of a transfer robot for replacing workpieces, and the like. That is, examples of the auxiliary drive units 18 include independently operating devices such as a coolant device, a magazine device, a transfer robot, etc.

The numerical control device 10 for controlling the machine tool 12 is constructed of a computer having an unillustrated processor, memory and input/output interface. The numerical control device 10 functions as a control unit of the machine tool 12 by the processor executing a system program (not shown) stored in the memory.

Inside the numerical control device 10, a program look-ahead unit 22 and a program execution unit 24 are constructed by the function of the control unit. Here, it is preferable that an unillustrated buffer for storing analysis results (execution data) of the program look-ahead unit 22 is provided between the program look-ahead unit 22 and the program execution unit 24.

Further, the numerical control device 10 stores the above-described machining program 20 for arbitrarily moving the tool of the machine tool 12 and the workpiece in a program storage unit 26 (storage area of memory). The machining program 20 is constructed as desired by the user of the machine tool 12.

The numerical control device 10 carries out machining operations by executing the machining program 20 to thereby drive the machining axis drive units 14 and the spindle drive unit 16. It should be noted that the numerical control device 10 may be configured to receive a machining program 20 transmitted from the outside through an unillustrated built-in communication device and then immediately execute the program.

Figure 2:
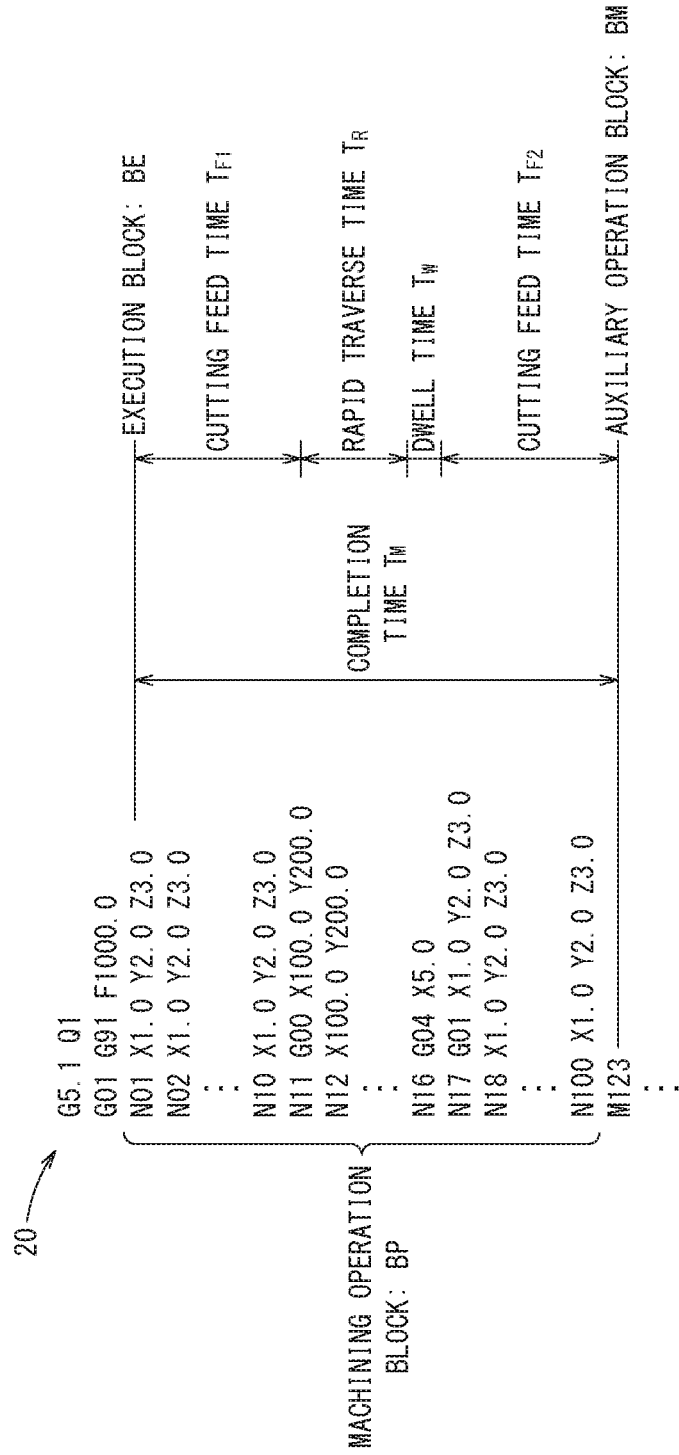
FIG. 2 is an explanatory diagram showing an example of a machining program applied to the numerical control device of FIG. 1.

For example, as shown in FIG. 2, the machining program 20 is constituted of sequences of codes, numerical values indicating the movement along the axes, and others. Here, the initial letter N with the subsequent numerical value indicates a sequence number. Although the sequence numbers are allotted in numerical order in the illustrated example, they need not be arranged in numerical order.

In addition, the initial letter X, Y or Z with a subsequent numerical value indicates the amount of movement in each axis. The initial letter F with a subsequent numerical value is a machining code indicating the feed speed of each axis. The initial letter G with a subsequent numerical value indicates a code for machining preparation (type of machining operation). The initial letter M with a subsequent numerical value indicates a code of an auxiliary operation (auxiliary function code). Note that the auxiliary function code is not limited to the M-code, but includes, for example, B-codes (an initial letter B with a numeric value).

That is, in the machining program 20 in FIG. 2, G-codes designate the details of machining operations (types of operation) while sequence numbers N01, N02, . . . , N100

(without G-code written) describe how machining is to be performed. Further, the M-code after N100 describes that an auxiliary operation is to be performed.

As to operation types of machining based on G-code, in the machining program 20, one operation type is defined by a segment from a sequence-numbered block with a G-code inserted to the previous block of a sequence-numbered block with a next G-code inserted. Example of operation types include cutting feed operation for cutting the workpiece by movement along each axis, rapid traverse operation for rapid traversing of axis, dwell operation for stopping the program for a set time, and the like. In the cutting feed operation in the present embodiment, the absolute mode (absolute position method) and the incremental mode (relative position method) are collectively handled, but they may be divided into different operation types. In the following description of operation types, the above-described three examples, i.e., cutting feed operation, rapid traverse operation and dwell operation will be described by way of example only.

The program look-ahead unit 22 shown in FIG. 1 is a functional unit that reads a machining program 20 ahead of the program execution unit 24 (i.e., prereads the machining program) and analyzes the machining program 20. The program look-ahead unit 22 reads out a machining program 20 as shown in the drawing from the program storage unit 26 and sequentially analyzes, in order from the first block (initial block), a plurality of blocks forming the machining program 20 (hereinbelow referred to as look-ahead analysis).

In this look-ahead analysis, the details of operation of each block, the number of blocks being subjected to look-ahead analysis, detailed contents (operation types) of the machining operation constituted by multiple blocks are recognized. Then, the program look-ahead unit 22, when performing look-ahead analysis on the blocks (machining operation blocks BP) other than independent auxiliary operations, outputs the result of analysis to the program execution unit 24. On the other hand, the program look-ahead unit 22, when detecting a block (auxiliary operation block BM) of an independent auxiliary operation having an auxiliary function code included in the machining program 20 by look-ahead analysis, outputs the result of detection (which will be hereinbelow referred to as auxiliary operation detection information I) to the program execution unit 24.

Figure 3:
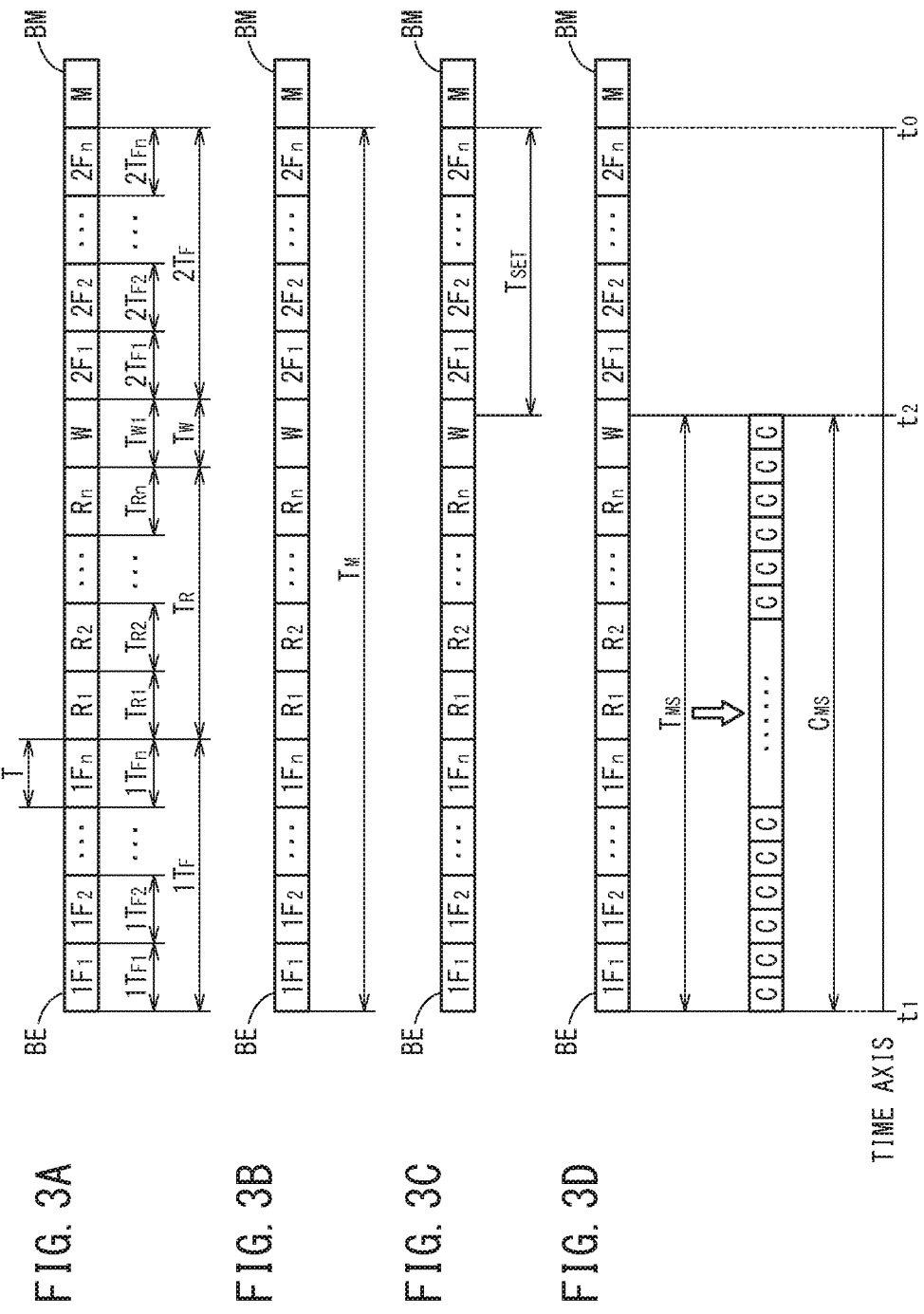
FIG. 3A is an explanatory diagram conceptually showing blocks in a machining program and the length of each execution time to be calculated.
FIG. 3B is an explanatory diagram conceptually showing the same blocks and the length of a look-ahead time.
FIG. 3C is an explanatory diagram conceptually showing the same blocks and the length of an offset time.
FIG. 3D is an explanatory diagram conceptually showing the same blocks, the length of time until start and an auxiliary operation count.

As shown in FIG. 3A, the program look-ahead unit 22 calculates execution time T for each block in look-ahead analysis using the following equation (1):

$$T = L_B / F_{BI} \quad (1)$$

where $L_B$ is the amount of movement of the moving member when the moving member of the machining axis drive unit 14 moves along the axis, and can be calculated based on the amount of movement for each of the X-axis, the Y-axis, and the Z-axis. The $F_{BI}$ is the feed speed at which the moving member moves along the axis and is set by the F-code written together with the line of the G-code (see also FIG. 2). In the case of stopping the moving member (for example, setting the dwell time by the G-code) etc., a symbol with a numerical value that is written together in the G-code line, indicates the pause time (x5.0 in the block with sequence number N16 in FIG. 2). The execution time T for each block calculated by the equation (1) is stored in an unillustrated look-ahead analysis storage unit (storage area of memory) in the program look-ahead unit 22 in association with the aforementioned operation type.

Then, upon detecting an auxiliary function code, the program look-ahead unit 22 reads the execution time T for each block stored in the look-ahead analysis storage unit and calculates the time for each operation type by the following equations (2) to (4) (see FIGS. 2 and 3A). This is done for the program execution unit 24 to instruct the execution timing of independent auxiliary operations.

$$T_F = T_{F1} + T_{F2} + \ldots + T_{Fn} \quad (2)$$

$$T_R = T_{R1} + T_{R2} + \ldots + T_{Rn} \quad (3)$$

$$T_W = T_{W1} + T_{W2} + \ldots + T_{Wn} \quad (4)$$

where:

$T_F$ is the time required for cutting feed operation (cutting feed time);

$T_R$ is the time required for rapid traverse operation (rapid traverse time); and $T_W$ is the dwell operation time (dwell time).

Also, n is the number of blocks included in each operation type.

As described above, the numerical control device 10 can recognize the time required for each operation type by calculating the time (cutting feed time $T_F$, rapid traverse time $T_R$, dwell time $T_W$, etc.) for each operation type. Here, instead of calculating the execution time T for each block at the time of normal look-ahead analysis, the program look-ahead unit 22 may be configured to start calculating the execution time T by using the detection of an independent auxiliary operation as a trigger, and then calculate the cutting feed time $T_F$, rapid traverse time $T_R$ and dwell time $T_W$.

Further, when detecting an independent auxiliary operation, the program look-ahead unit 22 generates auxiliary operation detection information I including the detected auxiliary operation block BM and the times calculated for respective operation types (cutting feed time $T_F$, rapid traverse time $T_R$, dwell time $T_W$, etc.). Then, this auxiliary operation detection information I is output to the program execution unit 24.

Returning to FIG. 1, the program execution unit 24 of the numerical control device 10 is configured as a functional unit that executes the machining program 20 that has been read ahead and analyzed by the program look-ahead unit 22. The program execution unit 24 includes a machining operation control unit 28 that mainly controls operations of the machining axis drive units 14 and the spindle drive unit 16, and an auxiliary operation control unit 30 that mainly controls operations of the auxiliary drive units 18.

The machining operation control unit 28 reads the blocks that have been analyzed by the program look-ahead unit 22 and stored in the buffer and then executes commands according to the blocks to thereby preform machining operations and linked auxiliary operations of the machine tool 12 as a control target. In particular, the machining operation control unit 28 controls driving of the machining axis drive units 14 and the spindle drive unit 16 to thereby control motions of the tool or the workpiece.

At this time, the machining operation control unit 28 performs the execution process based on the execution data of the first block among the blocks stored in the buffer. Then, the machining operation control unit 28 deletes the execution data for which the execution process has been completed from the buffer. As a result, only the blocks that have not yet been executed after the prereading performed by the program look-ahead unit 22 remains in the buffer.

In addition, the auxiliary operation control unit 30 of the program execution unit 24 is in a standby state during normal machining operation in which no independent auxiliary operation is detected. Then, upon receiving the auxiliary operation detection information I from the program look-ahead unit 22, the control unit 30 begins a process to control the execution of the independent auxiliary operation.

The auxiliary operation control unit 30 incorporates a count calculator 32 and a count processor 34. Further, the auxiliary operation control unit 30 contains therein an auxiliary operation process storage unit 36 (storage area of memory) for storing information used for the processing of the count calculator 32.

The count calculator 32 calculates information (auxiliary operation count $C_{MS}$) related to the time until the start of the independent auxiliary operation (see FIG. 3D) in order to start the independent auxiliary operation in conformity with the machining operation in progress. In other words, the auxiliary operation control unit 30 actuates the auxiliary drive unit 18 at appropriate timing based on the auxiliary operation count $C_{MS}$ calculated by the count calculator 32.

In the calculation of the auxiliary operation count $C_{MS}$, the count calculator 32 uses the time for each operation type (cutting feed time $T_F$, rapid traverse time $T_R$, dwell time $T_W$) included in the auxiliary operation detection information I. Specifically, as shown in FIG. 2 and FIG. 3B, upon reception of the auxiliary operation detection information I, the machining operation control unit 28 recognizes the execution block BE currently being processed. At this time, it is preferable to recognize a more detailed time (execution detected time $t_1$ of the execution block BE) within the execution block BE.

Then, the count calculator 32 calculates the time (hereinafter referred to as completion time $T_M$) from the execution block BE to the auxiliary operation block BM in which the auxiliary function code is written. The completion time $T_M$ corresponds to the time required to complete execution of all machining operation blocks BP that have not yet been executed, out of the already-preread machining operation blocks BP, at a detection time when the auxiliary operation block BM is detected in the prereading of the program look-ahead unit 22. At this time, the count calculator 32 takes into consideration override information input by the user or the like of the machine tool 12. The override information is given as magnifications with which the user arbitrarily adjusts the axial feed speeds and other speeds in the machining operation. For example, the user can set the override in the range of 0% to 200%, in accordance with the machining shape etc., of the workpiece.

Specifically, the count calculator 32 calculates the completion time $T_M$ using the following equation (5):

$$T_M = T_F \times K_{FO} + T_R \times K_{RO} + T_W \times K_{WO} \quad (5)$$

where:
  $K_{FO}$ is an override coefficient for cutting feed operations;
  $K_{RO}$ is an override coefficient of rapid traverse operations; and
  $K_{WO}$ is an override coefficient of dwell operations.

As described above, by multiplying the cutting feed time $T_F$, the rapid traverse time $T_R$, and the dwell time $T_W$ by the override coefficients $K_{FO}$, $K_{RO}$ and $K_{WO}$, respectively, it is possible to calculate the more accurate completion time $T_M$.

Further, the count calculator 32 sets an execution start time $t_2$ at which the independent auxiliary operation is started, based on the auxiliary function code (M-code or B-code) included in the auxiliary operation detection information I. At this time, the count calculator 32 refers to a condition table 40 stored in advance in the auxiliary operation process storage unit 36, and selects and extracts an offset time $T_{SET}$ set for each auxiliary function code.

Figure 4:
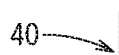
FIG. 4 is an example of a condition table.

As shown in FIG. 4, the condition table 40 gives multiple auxiliary function codes and offset times $T_{SET}$ associated respectively with the auxiliary function codes. Therefore, the count calculator 32 can easily extract the corresponding offset time $T_{SET}$ based on the auxiliary function code included in the auxiliary operation detection information I. As shown in FIG. 3C, the offset time $T_{SET}$ corresponds to the deviation (i.e., offset) of the execution start time $t_2$ from a detection time to of the independent auxiliary operation. That is, starting of the independent auxiliary operation is advanced or delayed by the offset time $T_{SET}$, relative to the auxiliary operation block.

Of the auxiliary function codes in the condition table 40 in FIG. 4, for example, M102 and B102 are set with negative offset times $T_{SET}$. This defines delayed start of the independent auxiliary operation. For example, supply of the cutting fluid or stop of supply thereof may be performed after the auxiliary operation block BM, and thus by setting such a minus value, the operation can be properly performed at delayed timing.

By extracting an offset time $T_{SET}$ and using the following equation (6), the count calculator 32 calculates an execution standby time $T_{MS}$ from the execution block BE currently being executed by the program execution unit 24 up to the start of the independent auxiliary operation, as shown in FIG. 3D.

$$T_{MS} = T_M - T_{SET} \quad (6)$$

That is, the execution standby time $T_{MS}$ is simply calculated by subtracting the offset time $T_{SET}$ from the completion time $T_M$. With this procedure, the numerical control device 10 can precisely recognize how long the device 10 should wait after the current execution block BE (execution detected time $t_1$) to start the independent auxiliary operation.

Further, after calculating the execution standby time $T_{MS}$ from the equation (6), the count calculator 32 calculates the auxiliary operation count $C_{MS}$ in order to do a countdown to actual start of the independent auxiliary operation. For example, the auxiliary operation count $C_{MS}$ is calculated by the following equation (7). That is, the auxiliary operation count $C_{MS}$ is information related to the execution standby time $T_{MS}$.

$$C_{MS} = T_{MS}/C \quad (7)$$

Here, C is an interpolation cycle that defines a predetermined time length based on which the count processor 34 described later counts the auxiliary operation count $C_{MS}$, and is set as appropriate in accordance with the machine tool 12 in which the numerical control device 10 is installed. The interpolation cycle C is stored beforehand in the auxiliary operation process storage unit 36, and is read out at the time of calculation of the auxiliary operation count $C_{MS}$. It should be noted that the interpolation cycle C may be configured such that the user can set it as desired.

For example, the interpolation cycle C preferably has a time width which is shorter in some degree than the average time required for performing the machining operation corresponding to one block in the machining program 20. This setting makes it possible to decrease the auxiliary operation count $C_{MS}$ equally while the program execution unit 24 is executing a program for each block. Further, even when the program execution unit 24 is executing the machining operation blocks BP, it is possible to immediately start the independent auxiliary operation as soon as the auxiliary operation count reaches zero.

Upon calculating the auxiliary operation count $C_{MS}$, the count calculator 32 sets this auxiliary operation count $C_{MS}$ in the counter register of the program execution unit 24. Then, control is transferred to the count processor 34.

The count processor 34 starts counting for this auxiliary operation count $C_{MS}$ as the information on the auxiliary operation count $C_{MS}$ is set by the count calculator 32 during the machining operation. The count processor 34 decrements the set auxiliary operation count $C_{MS}$ by one each time a certain period of time elapses by repeating a predetermined flow, and starts the independent auxiliary operation when the auxiliary operation count $C_{MS}$ reaches zero.

The numerical control device 10 according to the present embodiment is basically configured as described above. Now, the function and effect of the device will be described hereinbelow.

Figure 5:
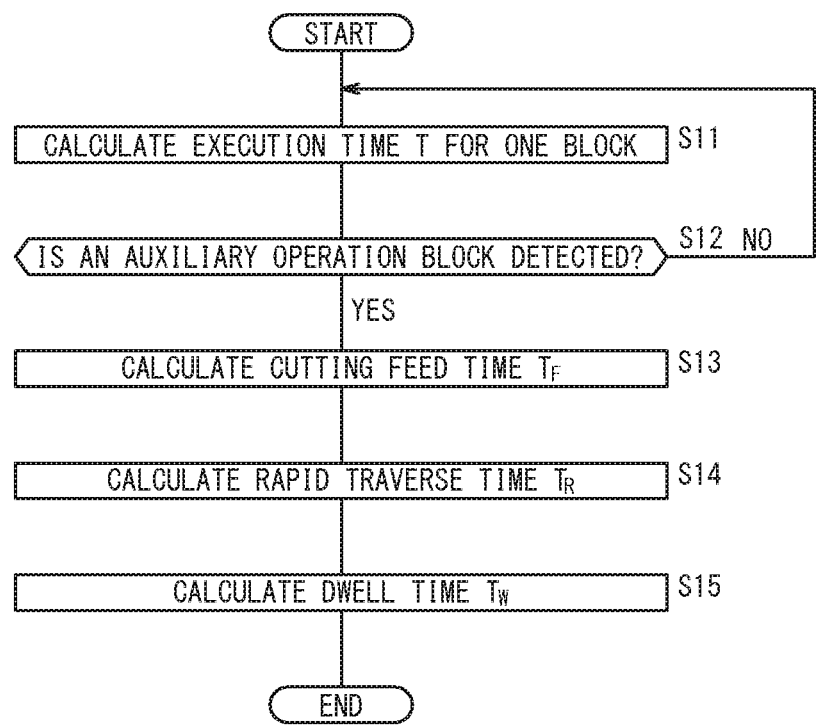
FIG. 5 is a flowchart showing a processing flow of a program look-ahead unit.

When controlling the machine tool 12, the numerical control device 10 reads out the machining program 20 by the program look-ahead unit 22 and analyzes the machining program 20 (look-ahead step). As shown in FIG. 5, the program look-ahead unit 22, based on the above equation (1), calculates the execution time T for one block written in the machining program 20 (step S11), and stores the calculated execution time T. At this time, the execution time T is stored in association with the operation type of the machining operation.

Then, the program look-ahead unit 22 determines whether or not an auxiliary operation block BM (auxiliary function code) has been detected in the look-ahead analysis (step S12). If no auxiliary operation block BM is detected, the control returns to step S11 to repeat look-ahead analysis. When an auxiliary operation block BM has been detected, the control goes to step S13.

Upon detecting the auxiliary operation block BM, the program look-ahead unit 22 calculates the cutting feed time $T_F$ for executing the cutting feed operation (step S13). At this time, the program look-ahead unit 22 reads the blocks corresponding to the cutting feed operation stored in the look-ahead analysis storage unit together with the execution times T, calculates the cutting feed time $T_F$ according to the above-described equation (2), and stores the calculated result into the memory of the numerical control device 10.

Further, the program look-ahead unit 22 calculates, by the same process as that for the cutting feed time $T_F$, the rapid traverse time $T_R$ for performing a rapid traverse operation (step S14), and further calculates the dwell time $T_W$ for performing the dwell operation (step S15). That is, the equation (3) is used to calculate the rapid traverse time $T_R$, and the equation (4) is used to calculate the dwell time $T_W$. It is a matter of course that the order (steps S13 to S15) of time calculation of individual operation types is not particularly limited.

As above, the program look-ahead unit 22 completes the processing when an auxiliary operation block BM is detected. Further, the program look-ahead unit 22 restarts the above process flow to perform look-ahead analysis after a certain time has elapsed (for example, at the time at which the program execution unit 24 starts the independent auxiliary operation).

On the other hand, the program execution unit 24 performs a machining operation or linked auxiliary operations based on the machining program 20 analyzed by the program look-ahead unit 22. At this time, the machining operation control unit 28 sequentially executes the machining operation blocks BP of the machining program 20 in order from the initial block to thereby control driving of the machining axis drive units 14 and the spindle drive unit 16. Then, the program execution unit 24 places the auxiliary operation control unit 30 in a standby state, and starts the processing flow (execution steps) for setting the start time of an independent auxiliary operation when receiving auxiliary operation detection information I from the program look-ahead unit 22.

Figure 6:
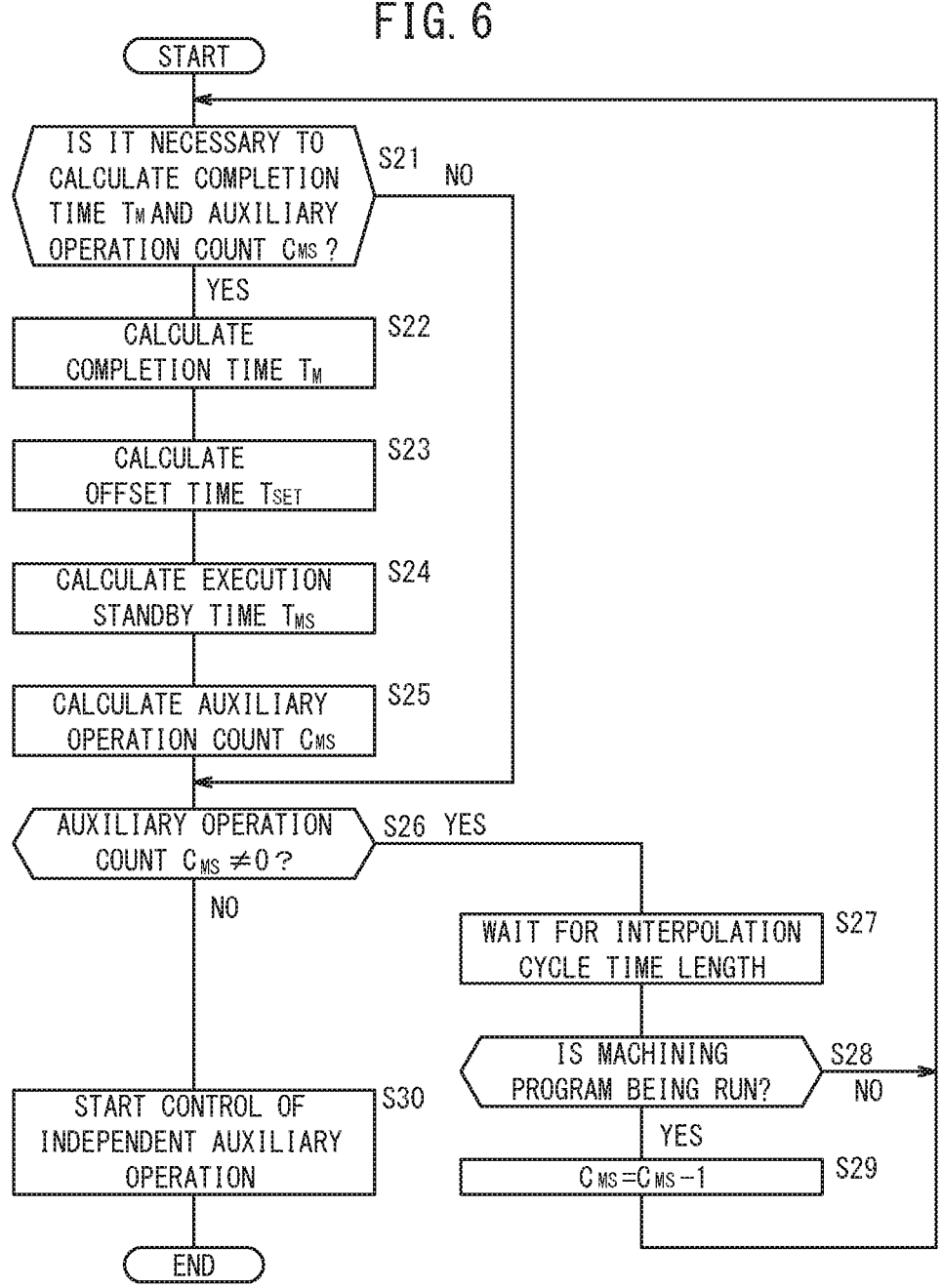
FIG. 6 is a flowchart showing a processing flow of a program execution unit.

As shown in FIG. 6, the auxiliary operation control unit 30 first determines whether it is necessary to calculate the execution standby time $T_{MS}$ and the auxiliary operation count $C_{MS}$ (step S21). More specifically, the auxiliary operation control unit 30 determines whether or not the first auxiliary operation detection information I has been received, or whether or not an override has been changed. When calculation of the execution standby time $T_{MS}$ and the auxiliary operation count $C_{MS}$ is necessary, that is, when the auxiliary operation detection information I is received for the first time or an override is changed by the user, the control goes to step S22. On the other hand, if it is not necessary to calculate the execution standby time $T_{MS}$ or the auxiliary operation count $C_{MS}$, the control, skipping steps S22 to S25, goes to step S26.

At step S22, the count calculator 32 calculates, using the equation (5), the completion time $T_M$ from the execution block BE currently being processed by the program execution unit 24 up to the auxiliary operation block BM included in the auxiliary operation detection information I. In addition, the count calculator 32 refers to the condition table 40 stored in the auxiliary operation process storage unit 36 to set the offset time $T_{SET}$ of the independent auxiliary operation corresponding to the auxiliary function code (step S23).

Then, the count calculator 32 calculates the execution standby time $T_{MS}$ based on the equation (6), using the calculated completion time $T_M$ and the extracted offset time $T_{SET}$ (step S24). With this calculation, it is possible to obtain an accurate time from the current execution block BE up to the start of the independent auxiliary operation.

Thereafter, in order to enable the count processor 34 to count, the count calculator 32 calculates the auxiliary operation count $C_{MS}$, based on the equation (7) by using the calculated execution standby time $T_{MS}$ and the interpolation cycle C stored in the auxiliary operation process storage unit 36 (step S25). The calculated auxiliary operation count $C_{MS}$ is set in the counter register.

Next, the count processor 34 starts processing and judges whether the auxiliary operation count $C_{MS}$ is other than zero or zero (step S26). If the auxiliary operation count $C_{MS}$ is other than zero, the process proceeds to step S27. If the auxiliary operation count $C_{MS}$ is zero, the process goes to step S30.

At step S27, the count processor 34 waits for a period of time corresponding to the interpolation cycle C, so that the period of time elapses. Then, the count processor 34 determines whether the machining program 20 is being run or suspended (step S28). If the machining program 20 is suspended, the control returns to step S21. If the machining program 20 is being run, the control goes to step S29.

At step S29, the count processor 34 performs one counting operation on the auxiliary operation count $C_{MS}$. That is, the decrement operation of $C_{MS}=C_{MS}-1$ is performed. After step S29, the control returns to step S21 to continue the above-described processing flow. In the second and subsequent processing flows, if no override has been changed, the control jumps from step S21 to step S26 so as to check the auxiliary operation count $C_{MS}$ directly.

When the auxiliary operation count $C_{MS}$ is zero at step S26, the auxiliary operation control unit 30 outputs a start signal (operation command) of the independent auxiliary operation to the auxiliary drive unit 18, and starts controlling of the independent auxiliary operation (step S30). Thus, the auxiliary operation control unit 30 enables the auxiliary drive unit 18 to perform the auxiliary operation at the optimal timing.

As described above, according to the present embodiment, when detecting an auxiliary operation block BM in the machining program 20 by look-ahead analysis, the numerical control device 10 can shift the execution start time $t_2$ of the auxiliary operation block BM by the offset time $T_{SET}$ corresponding to the auxiliary function code. Accordingly, the program execution unit 24 can start controlling of the auxiliary operation at a time suitable for the machining operation. Therefore, the numerical control device 10 can favorably set the execution time of the auxiliary operation to thereby improve scheduling of control and shorten the machining time.

Further, the numerical control device 10 calculates the completion time $T_M$ and subtracts the offset time $T_{SET}$ from the completion time $T_M$, thereby accurately calculating the execution start time $t_2$ of the auxiliary operation. Further, the program execution unit 24, by referring to the condition table 40 in the auxiliary operation process storage unit 36, can easily set the offset time $T_{SET}$ depending on the type of auxiliary operation.

Furthermore, the numerical control device 10 calculates the completion time $T_M$ more accurately by calculating the execution time T for each block based on the movement amount and the movement speed of the axis movement designated by the machining operation blocks BP. Then, the numerical control device 10 calculates the operation time for each type of machining operation, and multiplies the operation time by the corresponding override coefficient for adjusting the machining speed, thereby making it possible to produce a more exact execution time of the machining operation. Therefore, it is possible to obtain an accurate look-ahead time.

The numerical control device and the control method for the numerical control device according to the present invention are not limited to the above embodiment, and various modified examples and applied examples can be presented. For example, the configurations for calculation of the completion time $T_M$, setting of the offset time $T_{SET}$, calculation of the execution standby time $T_{MS}$, and calculation of the auxiliary operation count $C_{MS}$ (that is, the functions of the count calculator 32) may be partially or entirely installed in the program look-ahead unit 22. Further, the count processor 34 may be configured to start the independent auxiliary operation, by not only performing counting using the information of the auxiliary operation count $C_{MS}$ but also measuring the execution standby time $T_{MS}$ directly.

[Second Embodiment]

Figure 7:
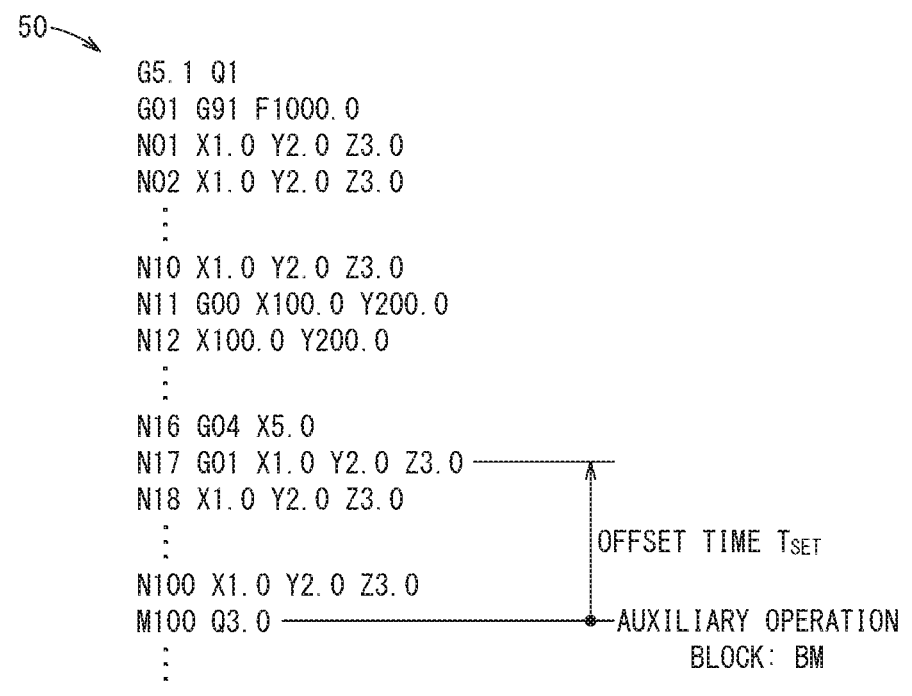

A machining program 50 according to the second embodiment shown in FIG. 7 differs from the machining program 20 according to the first embodiment in that, in setting the offset time $T_{SET}$, instead of referring to the condition table 40, the offset time is written in a block in the machining program 50. In the second embodiment, the configurations other than the machining program 50 are the same as that of the first embodiment, so that detailed description thereof will be omitted.

In this case, in the machining program 50, the offset time $T_{SET}$ is defined by an initial letter Q and a numerical value following the initial letter Q written on the same line as the auxiliary function code (M-code or B-code) of an independent auxiliary operation. The illustrated example indicates that the execution start time $t_2$ of the auxiliary operation is 3 seconds ahead of the auxiliary operation block BM.

In this manner, by writing the offset time $T_{SET}$ of the auxiliary operation in the auxiliary operation block BM in the machining program 50, the same effect as that of the numerical control device 10 of the first embodiment can be obtained. In particular, by use of the offset time $T_{SET}$ written together with the auxiliary function code, it becomes unnecessary for the numerical control device 10 to prepare the condition table 40, and the user can set the execution start time $t_2$ of the auxiliary operation as desired when writing the machining program 50.

It should be noted that the present invention is not limited to the above-described embodiments, and it goes without saying that various modifications can be made without departing from the gist of the present invention.

What is claimed is:

1. A numerical control device for controlling a machine tool configured to machine a workpiece with a tool, comprising:
   a program look-ahead unit configured to sequentially preread and analyze multiple blocks constituting a machining program in order from an initial one of the blocks; and
   a program execution unit configured to execute the blocks preread and analyzed by the program look-ahead unit to thereby control machining operations and an auxiliary operation configured to assist the machining operations, wherein:
   the multiple blocks include machining operation blocks with machining codes for performing the machining operations being written therein, and an auxiliary operation block with an auxiliary function code for performing the auxiliary operation being written therein;
   the program execution unit is configured to
   sequentially execute the blocks in order from the initial block,
   concerning the auxiliary operation block, shift an execution start time of the auxiliary operation block by an offset time corresponding to the auxiliary function code written in the auxiliary operation block,
   calculate a completion time required to complete execution of all machining operation blocks that have not yet been executed, among the already-preread machining operation blocks, at a detection time when the auxiliary operation block is detected by prereading of the program look-ahead unit, and
   start execution of the detected auxiliary operation block at the execution start time that is shifted by the offset time from the calculated completion time.

2. The numerical control device according to claim 1, wherein the program look-ahead unit or the program execution unit calculates an execution standby time from the detection time to the execution start time, and starts execution of the detected auxiliary operation block when the execution standby time has elapsed after the detection time.

3. The numerical control device according to claim 1, wherein: the program look-ahead unit or the program execution unit calculates an execution time for each of the machining operation blocks; and the program execution unit calculates the completion time using the calculated execution time for each of the machining operation blocks.

4. The numerical control device according to claim 3, wherein when the machining operation block is a command for an axis movement in the machine tool, the program look-ahead unit or the program execution unit calculates, as the execution time, a time required for the machine tool to perform the axis movement, based on a movement amount and a movement speed of the axis movement specified by the machining operation block.

5. The numerical control device according to claim 4, wherein the program look-ahead unit or the program execution unit compensates the execution time by using an override coefficient for adjusting the movement speed.

6. The numerical control device according to claim 3, wherein when the machining operation block is a command for a dwell operation, the program look-ahead unit or the program execution unit sets a dwell time specified by the machining operation block as the execution time.

7. The numerical control device according to claim 6, wherein the program look-ahead unit or the program execution unit compensates the execution time by using an override coefficient for adjusting the dwell time specified by the machining operation block.

8. The numerical control device according to claim 1, wherein the program execution unit has a table in which the offset time is stored in association with each of the auxiliary function codes.

9. The numerical control device according to claim 1, wherein the offset time corresponding to the auxiliary function code is written in the auxiliary operation block.

10. A control method for a numerical control device, the numerical control device controlling a machine tool configured to machine a workpiece with a tool, comprising:
a look-ahead step of sequentially prereading and analyzing multiple blocks constituting a machining program in order from an initial one of the blocks; and
an execution step of executing the blocks preread and analyzed in the look-ahead step to control machining operations and an auxiliary operation configured to assist the machining operations, wherein:
the multiple blocks include machining operation blocks with machining codes for performing the machining operations being written therein, and an auxiliary operation block with an auxiliary function code for performing the auxiliary operation being written therein; and
in the execution step,
the blocks are sequentially executed in order from the initial block,
concerning the auxiliary operation block, an execution start time of the auxiliary operation block is shifted by an offset time corresponding to the auxiliary function code written in the auxiliary operation block,
a completion time is calculated that is required to complete execution of all machining operation blocks that have not yet been executed, among the already-preread machining operation blocks, at a detection time when the auxiliary operation block is detected by prereading in the look-ahead step, and
execution of the detected auxiliary operation block is started at the
execution start time that is shifted by the offset time from the calculated completion time.

11. The control method according to claim 10, wherein: the look-ahead step calculates an execution time for each of the machining operation blocks; and the execution step calculates the completion time using the calculated execution time for each of the machining operation blocks.

12. The control method according to claim 10, wherein the execution step acquires the offset time from a table in which the offset time is stored in association with each of the auxiliary function codes.

13. The control method according to claim 10, wherein the offset time corresponding to the auxiliary function code is written in the auxiliary operation block.

* * * * *